July 9, 1968 R. C. ZIEGENFELDER 3,391,628
AIR EXHAUST FOR MOTOR VEHICLES
Filed Dec. 8, 1965 2 Sheets-Sheet 1

INVENTOR.
Robert C. Ziegenfelder
BY
Harness and Harris
ATTORNEYS.

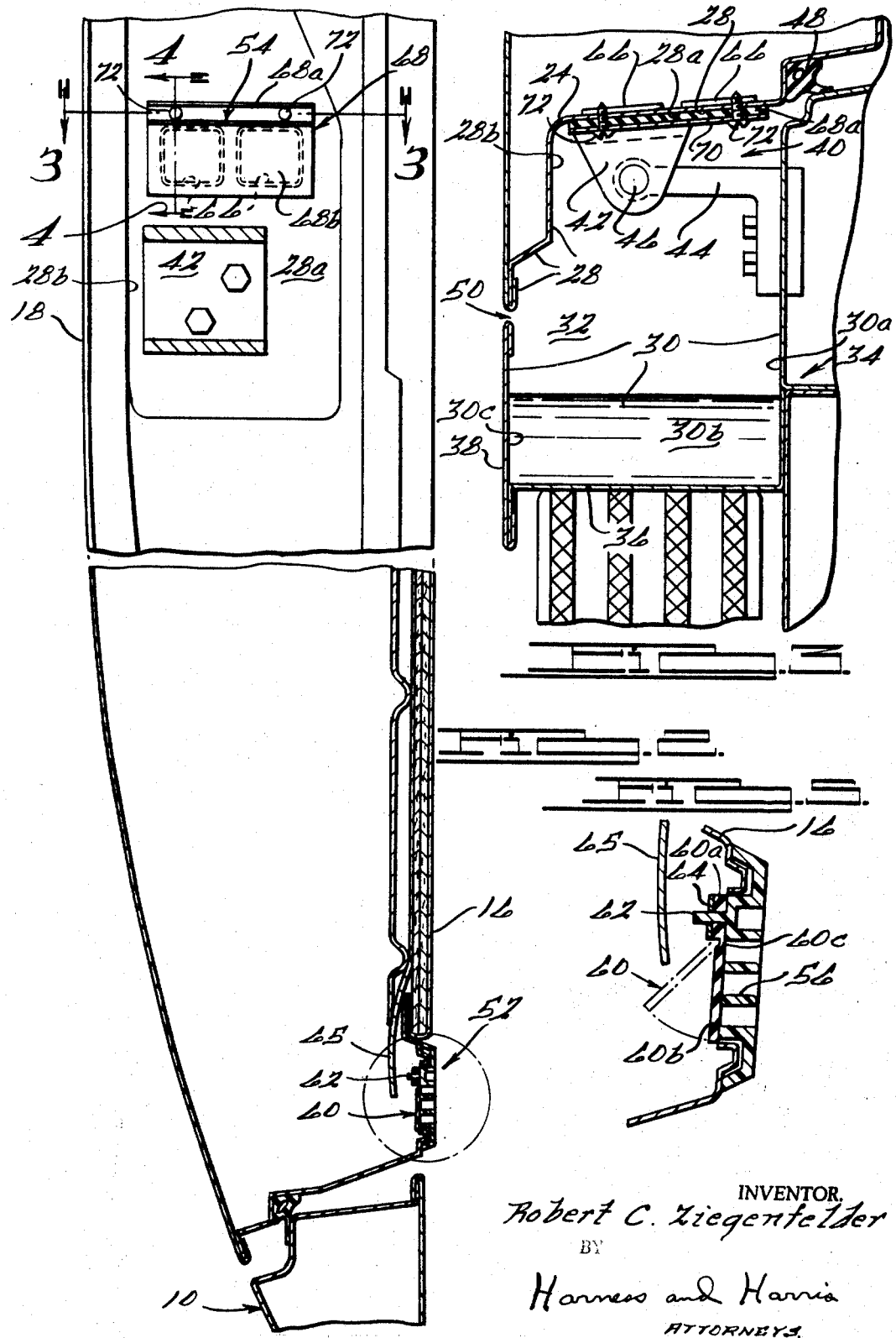

3,391,628
AIR EXHAUST FOR MOTOR VEHICLES
Robert C. Ziegenfelder, Warren, Mich., assignor to Chrysler Corporation, Highland Park, Mich., a corporation of Delaware
Filed Dec. 8, 1965, Ser. No. 512,312
11 Claims. (Cl. 98—2)

ABSTRACT OF THE DISCLOSURE

An air exhauster system for a motor vehicle in which a vertical edge of the passenger compartment door coacts in the closed position of the door with an adjacent wall surface of the vehicle body structure to define a chamber or cavity therebetween communicating with the exterior of the vehicle; an air intake grille is provided in the inner trim panel of the door adjacent the lower rear edge of the door and this grille communicates through the hollow interior of the door with a flap controlled opening in the aforesaid vehicle door edge to define an air passageway extending from the passenger compartment through the door and then through the chamber between the door edge and the adjacent body wall surface to the exterior of the vehicle.

---

This invention relates to an air exhauster system for an automobile.

An air exhauster system for an automobile comprises an arrangement whereby interior or passenger compartment air is selectively and automatically vented to the exterior of the automobile in an amount to generally equalize the interior and exterior pressures. Maintaining the air pressure in the passenger compartment at a relatively low value by selective outflow of air has several important advantages. Perhaps most importantly, it reduces the back pressure against which the heater blower has to work, thereby appreciably improving heater performance and efficiency. Also, in vehicles of the "hardtop" type, it precludes the understrained upper edges of the windows from being pushed outwardly away from their seating surfaces by excess interior pressure, thereby precluding the noise and promiscuous air flow that would attend such outward movement of the window upper edges. The selective outflow of "exhauster" air also has the effect of continuously purging the passenger compartment of smoky or otherwise contaminated air.

Various air exhauster systems have been proposed for automotive use. Each such system has been objectionable, however, because it required considerable and costly structural modification of the vehicle body structure, and/or because it required aesthetically displeasing alteration of the exterior sheet metal. Further, certain of the prior systems have been ineffectual in reducing the interior pressure to the desired level.

It is an object of the present invention to provide an improved air exhauster system for an automobile.

Another object is to provide an inexpensive yet effective automotive air exhauster system.

Yet another object is to provide an air exhauster system requiring no major structural modification of the vehicle body structure.

Still another object is to provide an air exhauster as aforesaid requiring no alteration of the interior sheet metal.

In the air exhauster system of the invention, an edge surface of a vehicle door coacts in the closed position of the door with an adjacent wall surface of the vehicle body structure to define a chamber or cavity therebetween which communicates with the exterior of the vehicle, and means are provided which define an air passageway which opens at one end in the interior of the vehicle and at its other end in the aforesaid chamber or cavity. The air passageway and air chamber thus line up serially to provide air communication between the exterior and interior of the vehicle.

In the disclosed embodiment of the invention, the chamber or cavity into which the air passageway opens is defined between the front or hinged vertical edge of the door and the adjacent vertical wall surface of the forward body pillar, and the air passageway is constituted by an opening in the inner wall or skin of the door communicating through the hollow interior of the door with an opening in the aforesaid vertical edge of the door. Interior or passenger compartment air may thus pass through the opening in the inner wall of the door, through the hollow interior of the door, and through the opening in the vertical edge of the door and into the aforesaid air chamber from where it may escape to the exterior the vehicle through the crack or space between the forward edge of the outer surface of the door and the rearward edge of the adjacent outer surface of the body structure. The invention thus provides an air exhauster system which is extremely effective but yet which requires no alteration of the vehicle body structure and no modification of the exterior sheet metal.

These and other objects, features and advantages of the invention will be be apparent from the following detailed description of a preferred embodiment of the invention and from the accompanying drawings wherein:

FIG. 2 is a sectional view taken generally on the line 2—2 of FIG. 1;

Figure 1:
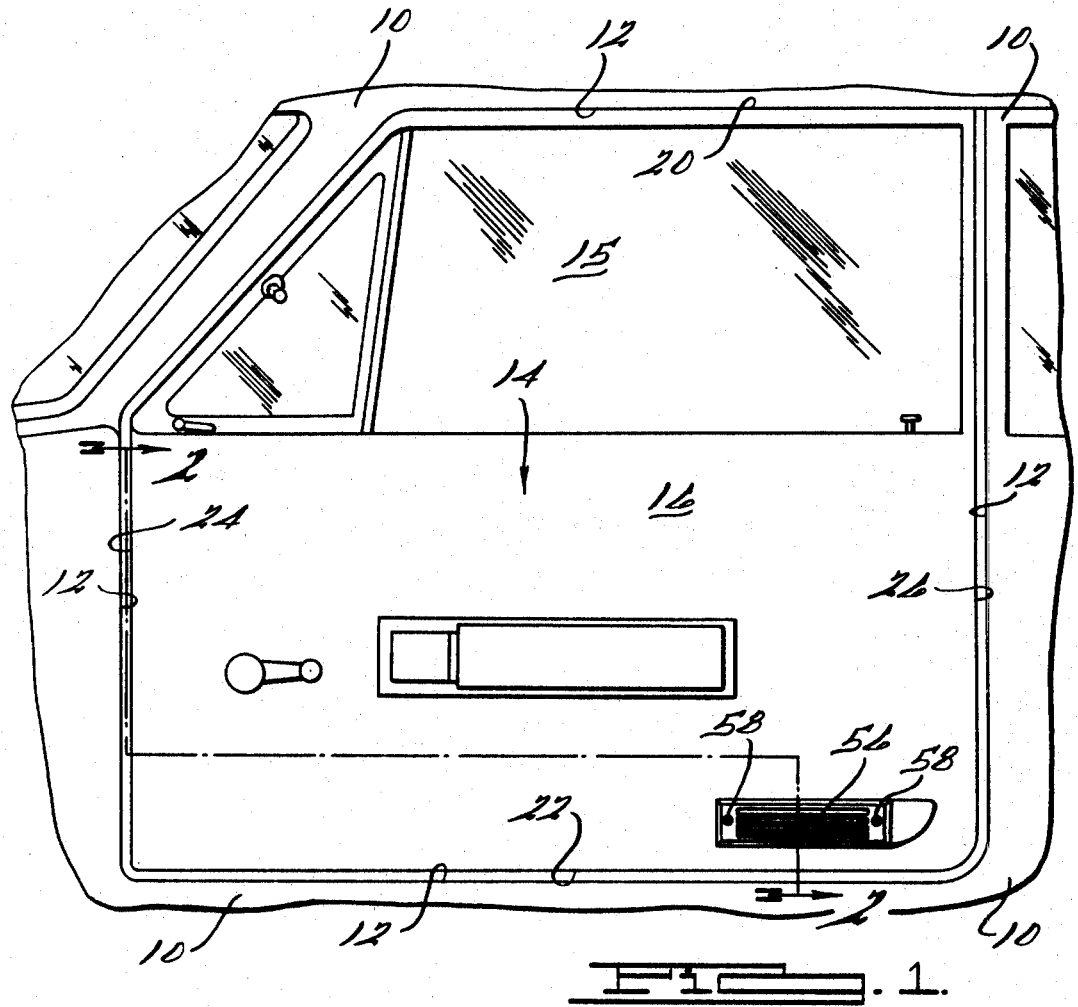
FIG. 1 is a fragmentary interior view of a motor vehicle embodying an air exhauster system according to the invention.
Figure 4:
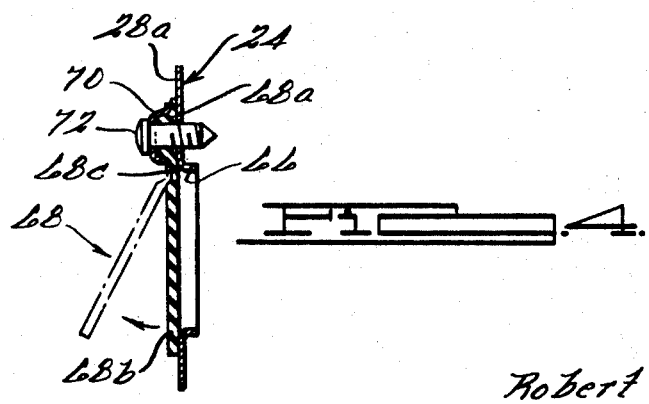

FIGS. 3 and 4 are sectional views taken on lines 3—3 and 4—4 respectively of FIG. 2; and FIG. 5 is a view on an enlarged scale of the structure within the dotted circle seen in the lower portion of FIG. 2.

The motor vehicle seen fragmentarily in the drawings includes a body structure 10 defining a door opening 12. A door 14 carrying a window glass 15 coacts with opening 12.

Door 14 is of hollow, generally box-like construction and includes an inner wall 16, an outer wall 18, upper and lower generally horizontally extending edge walls 20, 22, and forward and rearward generally vertically extending edge walls 24, 26.

Door 14 is mounted for pivotal movement about a generally vertical axis between an open position in which it extends angularly outwardly from body structure 10 to allow access through door opening 12 to the interior of the vehicle, and a closed position in which it is positioned within opening 12 to close the same.

In the closed position of the door, the exterior surface 28 of forward edge wall 24 coacts with an adjacent wall surface 30 of body structure 10 to define a cavity or chamber 32 therebetween. In the described embodiment, exterior door edge surface 28 includes a generally transversely extending portion 28a and a generally longitudinally extending portion 28b. Wall surface 30 is comprised of a generally vertical, longitudinally extending portion 30a defined at the outboard surface of the vehicle cowl structure 34, an arcuate portion 30b constituted by the rearward surface of the front wheel housing 36, and a generally vertical, longitudinally extending portion 30c defined at the inboard surface of front fender 38.

The pivotal mounting of door 14 is by upper and lower hinge structures 40, only the lower one of which is seen in the drawings. Each hinge structure includes a U-shaped hinge bracket 42 fixedly secured to transverse portion 28a of forward door edge surface 24, and an angle bracket 44 fixedly secured to portion 30a of wall surface 30 and carrying a hinge pin 46 at its free end journalled in the upper and lower arms of bracket 42.

Chamber 32 is hermetically sealed from the interior of the vehicle by resilient weather sealing strip 48 and communicates with the exterior of the vehicle at the outboard juncture 50 of door edge surface 28 and body structure wall surface 30.

An air intake opening 52 is formed in the inner wall 16 of door 14 and an air discharge opening 54 is formed in forward door edge wall 24.

Intake opening 52 comunicates through the hollow interior of door 14 with discharge opening 54 to provide an air passageway which lines up serially with chamber 32 to provide air communication between the interior and exterior of the vehicle.

Intake opening 52 is formed in the lower rear portion of door inner wall 16. A stylized grille 56 is positioned within opening 52 as by screws 58 engaging inner door wall 16. A rubber flap valve 60 is mounted within door 14 in a position normally blocking air passage through grille 56. Flap valve 60 includes a relatively thick mounting portion 60a and a depending skirt or flap portion 60b joined to mounting portion 60a by a relatively thin hinge portion 60c. Mounting portion 60a is impaled on a series of prongs 62 projecting from the outboard side of grille 16. A retainer strip 64 locks mounting portion 60a in place and a shower curtain 65 of plastic material depends within door 14 to a level below at least the top portion of grille 56 to preclude entry of water into the vehicle through grille 56.

Discharge opening 54 comprises two generally rectangular openings 66 formed side by side in door edge wall 24 directly above lower hinge structure 40. A rubber flap valve 68 is mounted on the outside surface 28a of door edge wall 24 in a position normally blocking openings 66. Flap valve 68 includes a relatively thick mounting portion 68a and a depending skirt or flap portion 68b joined to mounting portion 68a by a relatively thin hinge portion 68c. Mounting portion 68a is clamped against surface 28a by a channel bar 70 secured to wall 24 as by screws 72.

When air pressure within the vehicle builds up to a level above that within the hollow of the door, skirt portion 60b of flap valve 60 pivots inwardly about hinge portion 60c to allow pressure equalizing air flow out of the vehicle and into the door. When the pressure within the vehicle is equal to or less than the pressure within the door, flap valve 60 closes to preclude the flow of air and foreign matter into the vehicle.

When air pressure within the door builds up to a level above the exterior pressure, skirt portion 68b of flap valve 68 pivots outwardly about hinge portion 68c to allow pressure equalizing air flow out of the door and into chamber 32, from where it escapes to atmosphere through juncture 50. When the pressure within the door is equal to or less than exterior pressure, flap valve 68 closes to preclude the flow of air and foreign matter into the door. The described arrangement thus operates to selectively and automatically vent passenger compartment air to the atmosphere while precluding flow of air and foreign matter into the vehicle.

The invention thus provides an exhauster system which is effective to maintain the passenger compartment pressure at the desired relatively low value without sacrificing the structural integrity of the vehicle body and without violating the aesthetics of the exterior sheet metal.

While a preferred embodiment of the invention has been illustrated and described in detail, it is to be understood that various changes may be made in the disclosed embodiment without departing from the scope or spirit of the invention as defined in the appended claims.

I claim:

1. In combination, a motor vehicle comprising
    (A) a body structure defining a door opening;
    (B) a door;
    (C) means mounting said door on said body structure for movement between
        (1) an open position in which it allows access through said door opening to the interior of said body structure and
        (2) a closed position in which it is positioned within and closes said door opening with an edge surface thereof coacting with an adjacent wall surface of said body structure to define a cavity therebetween communicating with the exterior of said vehicle; and
    (D) means defining an air passageway opening at one end in said interior and opening at its other end, with said door in its said closed position, in said cavity through said door edge surface, whereby to establish air communicating between the exterior and interior of said vehicle through said passageway and said cavity.

2. A motor vehicle according to claim 1 wherein said door edge surface is a vertical edge surface.

3. A motor vehicle according to claim 2 wherein said door is mounted adjacent said vertical edge surface for pivotal movement about a generally vertical axis.

4. A motor vehicle comprising
    (A) a body structure defining a door opening;
    (B) a door of hollow, generally box-like construction and including an inner wall, an outer wall, upper and lower generally horizontally extending edge walls, and forward and rearward generally vertically extending edge walls;
    (C) means mounting said door on said body structure adjacent said door opening for pivotal movement about a generally vertical axis between
        (1) an open position in which it extends angularly outwardly from said body structure to allow access through said door opening to the interior of said body structure and
        (2) a closed position in which it is positioned within said door opening to close the same;
    (D) means defining an air intake opening in said inner wall; and
    (E) means defining an air discharge opening in one of said edge walls communicating with the exterior of said vhicle with said door in its said closed position, whereby to establish, with said door in its closed position, air communication between the interior and exterior of said vehicle through said air inlet opening, the hollow interior of said door, and said air discharge opening.

5. A motor vehicle according to claim 4 wherein, in the closed position of said door, said outer door wall is generally flush with the adjacent outer surface of said body structure and said one edge wall is spaced from the adjacent wall surface of said body structure to define a chamber therebetween which communicates with the exterior of said vehicle at the juncture of said outer door wall and said adjacent outer surface and into which said discharge opening opens.

6. A motor vehicle according to claim 4 and further including a flap mounted on the outer surface of said one edge wall and normally covering said discharge opening, said flap being mounted for selective movement away from said discharge opening in response to air pressure inside said door in excess of the exterior air pressure, whereby to allow pressure equalizing air flow out of said door while precluding flow of air and foreign matter into said door.

7. A motor vehicle according to claim 6, and further including another flap mounted within said door on the outboard surface of said inner panel and normally covering said inlet opening, said other flap being mounted for selective movement away from said inlet opening in response to air pressure with said vehicle in excess of the air pressure inside said door, whereby to allow pressure equalizing air flow out of said vehicle interior and into said door while precluding flow of air and foreign matter out of said door and into said vehicle interior.

8. A motor vehicle according to claim 5 wherein said one edge wall is said forward edge wall and the pivotal axis of said door is adjacent said forward edge wall.

9. A motor vehicle according to claim 8 wherein said inlet opening is formed in said inner wall adjacent the lower edge of the latter.

10. A motor vehicle according to claim 9 wherein said inlet opening is formed adjacent the rearward edge of said inner wall.

11. In combination, a motor vehicle comprising
 (A) a body structure defining a passenger compartment and a generally vertically oriented, generally rectangular door opening at one side of said passenger compartment extending generally longitudinally of said vehicle;
 (B) a generally rectangular door;
 (C) means mounting said door on said body structure for movement between
  (1) an open position in which it allows access through said door opening to said passenger compartment, and
  (2) a closed position in which it is positioned within and closes said door opening with an edge surface thereof coacting with an adjacent wall surface of said body structure to define a cavity therebetween communicating with the exterior of said vehicle, and
 (D) means defining an air passageway opening at one end in said passenger compartment and at its other end in said cavity with said door in its said closed position, whereby to establish an exhaust path for said passenger compartment through said passageway and said cavity.

References Cited
UNITED STATES PATENTS

| | | | |
|---|---|---|---|
| 142,563 | 9/1873 | Gottleib | 98—87 |
| 2,391,408 | 12/1945 | Galamb | 98—2 |
| 3,286,617 | 11/1966 | Shirk | 98—2 |

MEYER PERLIN, *Primary Examiner.*